United States Patent [19]

Coatta

[11] 4,069,848
[45] Jan. 24, 1978

[54] TREE SHEARING DEVICE

[76] Inventor: Joseph Coatta, 560 Raymur Avenue, Vancouver, British Columbia, Canada, V6A 3L2

[21] Appl. No.: 682,603

[22] Filed: May 3, 1976

[30] Foreign Application Priority Data

Apr. 26, 1976 Canada .................................. 251043

[51] Int. Cl.² ............................................ A01G 23/08
[52] U.S. Cl. .................................. 144/34 E; 144/3 D
[58] Field of Search .................... 144/2 Z, 3 D, 34 R, 144/34 E, 309 AC

[56] References Cited

U.S. PATENT DOCUMENTS

| | | | |
|---|---|---|---|
| 3,540,501 | 11/1970 | Jonsson | 144/34 E |
| 3,865,160 | 2/1975 | McColl | 144/34 E X |
| 3,888,287 | 6/1975 | Johnson | 144/34 E |
| 3,920,057 | 11/1975 | Hamilton | 144/34 E |

Primary Examiner—Harrison L. Hinson
Assistant Examiner—W. D. Bray
Attorney, Agent, or Firm—George H. Riches & Associates

[57] ABSTRACT

This invention relates to an improved shearing device to be mounted on a tree harvesting vehicle having a pair of blade edges which move through inward downward directed arcs in shearing the tree. This movement provides the advantage of reducing cracking or splitting of the butt end of the cut log and additionally shatters the stump below the cut which exposes more of it to more rapid breakdown by the elements following cutting. In one embodiment, the frame of the tree shearing device mounted on the end of a boom mechanism on the vehicle has a U-shaped horizontal portion with spaced apart arms which define a front opening to receive the tree trunk therethrough. A pair of blade members, one of each of which is pivotally mounted on each of the arms, are pivoted inwardly and downwardly from the open to the closed position by a hydraulic cylinder connected to them adjacent their rear ends. A pin and slot connection between the two blade members ensure that they rotate concurrently. In a second embodiment, the lower portion of the frame is inclined forwardly downwardly and the spaced blade members are pivotally mounted on it. The blade edges of the blade members project forwardly and upwardly of this lower portion of the frame to receive the tree therebetween and the hydraulic cylinder is connected to the blade members adjacent their rear ends to drive them between the open and closed positions. This embodiment has the advantage over the first embodiment that it enables the tree to be cut closer to the ground, thereby reducing the height of the stump and accordingly the wastage.

12 Claims, 9 Drawing Figures

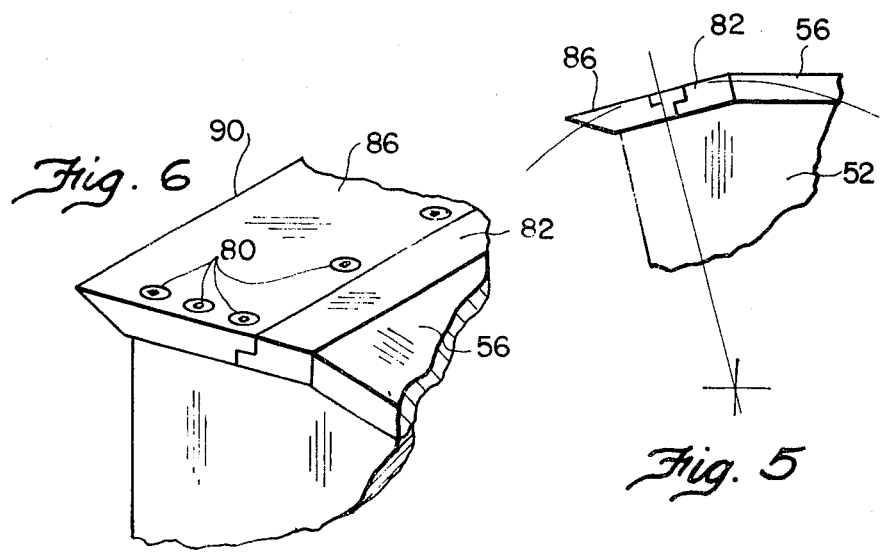
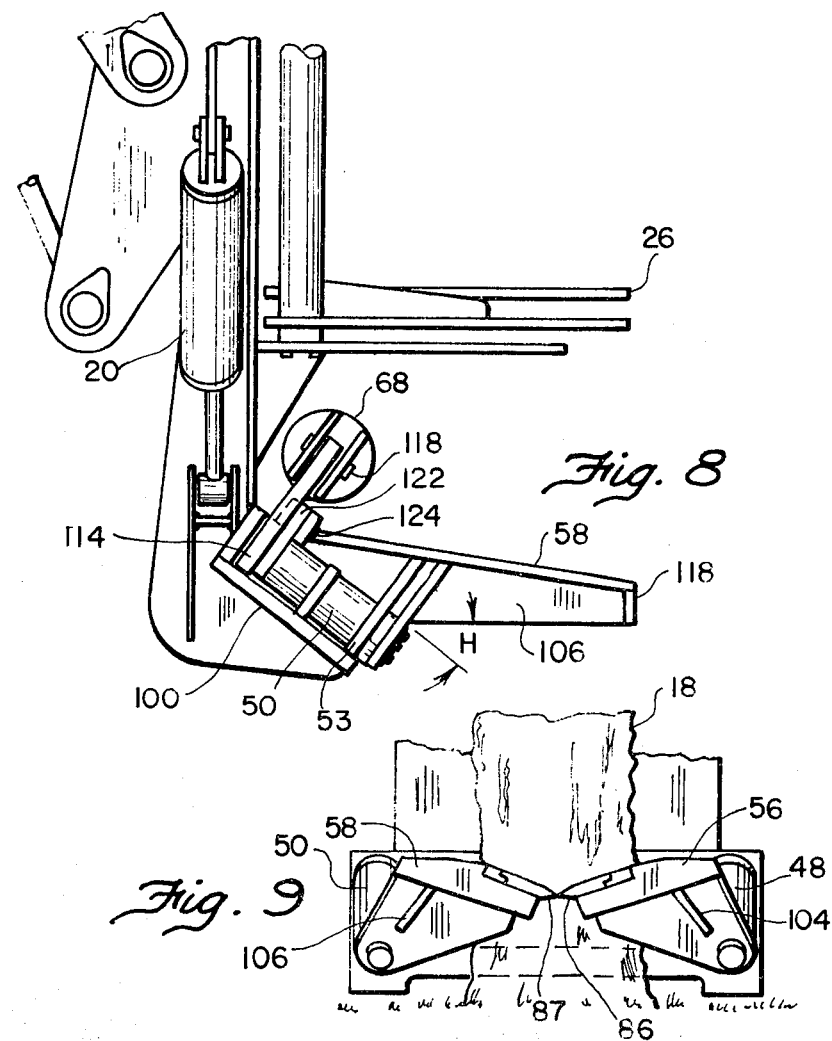

4,069,848

TREE SHEARING DEVICE

BACKGROUND OF THE INVENTION

This invention relates to a tree shear and more particularly to a tree shear to be mounted on a woodland vehicle in association with a suitable grapple to fell standing trees.

In the past, trees were felled manually which necessarily involved a very considerable labour expenditure. More recently, this has been improved by the use of vehicle mounted tree shearing devices for various types of tree harvesting. However, these previous vehicle mounted tree shearing devices have had the disadvantage that they crack or splinter the butt end of the tree trunk adjacent the cut. This shattered butt end of the log is nearly a complete loss as it cannot be used to produce good grade lumber. Recent attempts to overcome this problem have produced tree shearing mechanisms which are difficult to operate, relatively costly to manufacture and subject to frequent malfunction.

SUMMARY OF THE INVENTION

Splintering of the butt end of the tree during shearing is a problem of considerable economic importance and accordingly, it is an object of the present invention to at least partially overcome this problem by providing an improved vehicle mounted tree shearing device having a pair of blade edges which shear the tree trunk by moving inwardly together through a downward arc and which at the same time is relatively simple in structure so as to be economical to manufacture and not subject to frequent breakdown.

To this end, in one of its aspects, the invention provides a tree shearing device comprising a frame adapted to be mounted on a selected woodland vehicle; a pair of blade means pivotally mounted on said frame for pivotal reciprocal motion around a pair of substantially parallel axes between an open and closed position, each of the blade means having an elongated blade edge which abuts the other blade edge in the closed position; power means operatively connected to the blade means to move the blade means in opposite directions between the open and closed positions; and means interconnecting the blade means to ensure the blade means move concurrently, whereby the blade edges are moved from the open position on opppsite sides of a tree trunk inwardly downwardly through an arc to the closed position to shear the tree trunk and then returned to the open position to receive the next tree trunk therebetween.

Further objects and advantages of the invention will appear from the following description taken together with the accompanying drawings.

BRIEF DESCRIPTION OF THE DRAWINGS

FIG. 5 is a partial sectional view of one of the blade members illustrating the location of one of the lines shown in FIG. 4;

FIG. 6 is a partial perspective view showing the structure of one of the blades and blade members;

FIG. 8 is a side elevation view of the device seen in FIG. 7; and

FIG. 9 is a front perspective view showing the device seen in FIG. 7 shearing a tree.

DESCRIPTION OF THE PREFERRED EMBODIMENTS

Figure 1:
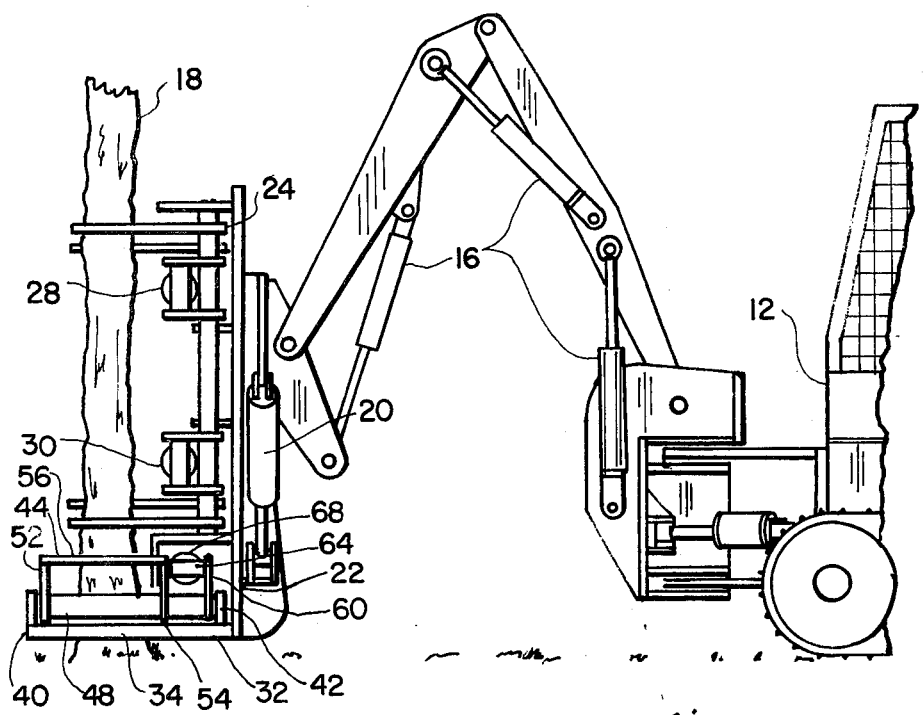
FIG. 1 is a side elevation view of a tree shearing device according to a first embodiment of the invention mounted on a suitable woodland vehicle.

Reference is first made to FIG. 1 which shows a tree shearing device 10 mounted on the rear of a suitable crawler type of woodland vehicle such as a Caterpillar D-8H (Trade mark) 12 by a suitable boom arrangement 14. Although the tree shearing device is mounted on the rear of the vehicle on this instance, throughout the disclosure and claims the terms "front" and "rear" are used to refer to the tree shearing device in the relationship in which it approaches the tree at the "front" and the vehicle is at the "rear". As may be seen, a number of hydraulic cylinders 16 are shown to allow the operator to operate the boom 14 to position the tree shearing device 10 at the base of a tree 18. Additional hydraulic cylinders 20 are shown to permit the operator to tilt the tree shearing device to a desired attitude to compensate for sloping ground and/or in the event that the tree is not growing vertically. However, in the following description and claims, the terms "horizontal" and "vertical" will be used on the assumption that the device is operating on level ground and the tree is growing straight up, although of course this need not necessarily be the case.

Figure 3:
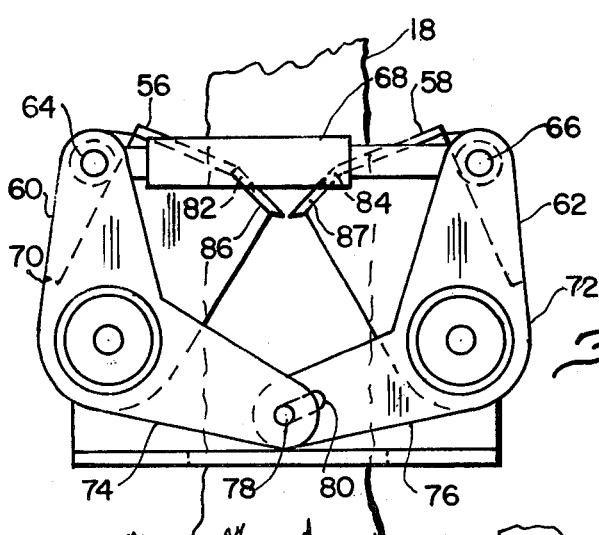
FIG. 3 is a partial sectional view looking forward showing the blade members of the device shown in FIG. 1.
Figure 2:
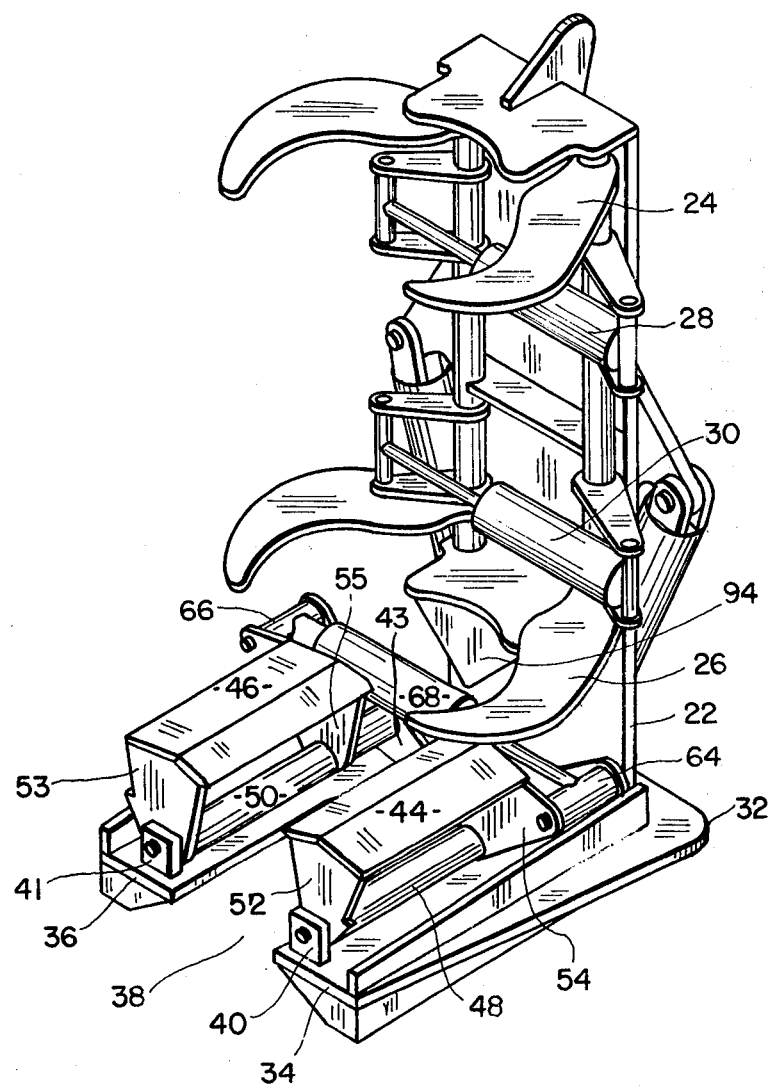
FIG. 2 is a perspective view from above and the front of the tree shearing device shown in FIG. 1.

Referring in more detail to the tree shearing device 10 shown in FIG. 2, it has a frame 22 mounted on the boom 14 and two pairs of suitable tree grapple arms 24, 26 vertically spaced on the frame 22 and operated by respective hydraulic cylinders 28, 30. The frame 22 has a lower horizontal U-shaped portion 32 with a pair of forwardly extending parallel spaced arms 34, 36 which define a front opening 38 to receive the tree 18 therebetween. A pair of front 40, 41 and rear 42, 43 brackets located on each of the arms 34, 36 of the U-shaped portion 32 of the frame 22 pivotally receive a pair of blade members 44, 46. Each of the blade members 44, 46 has a lower tube portion 48, 50 pivotally mounted between the front and rear brackets, front 52, 53 and rear 54, 55 upwardly extending blade arms rigidly attached to the tube portions and blade back-up plates 56, 58 extending between the upward extending arms. Each of the blade members 44, 46 has an upward extending cylinder arm 60, 62 rigidly attached to the lower tube portion 48, 50 adjacent the rear bracket 42, 43 and pins 64, 66 extending between the respective upper ends of cylinder arms 60, 62 and rear blade arms 54, 55 rotatably receive opposite ends of hydraulic cylinder 68 which is activated to pivotally reciprocate the blade members 44, 46 in a parallel relationship on the spaced arms 34, 36 of the frame 22. As clearly seen in FIG. 3, each of the upward extending cylinder arms 60, 62 is part of a link 70, 72 with a respective inward extending arm 74, 76, which inward extending arms are interconnected by pin 78 rigidly secured on arm 74 being received in slot 80 on arm 76. As will be apparent, this structure ensures that the blade members 44, 46 move in unison when the hydraulic cylinder 68 drives them in opposite directions between the open position shown in FIG. 2 and the closed position shown in FIG. 3. The respective lower tube portion 48, 50, front and rear blade arms 52, 53, 54, 55, back-up plate 56, 58 and link 70, 72 are normally welded together to form each rigid blade member 44, 46. As may be seen in FIG. 6, each back-up plate 56, 58 includes a stepped bolting plate 82, 84 which is welded across the arms 52, 53 and 54, 55. Each replaceable blade 56, 57 is then mounted to the respective arms and bolting plate 82, 84 by bolts 80 with its cutting edge 90, 92 projecting forwardly of the upward extending arms. A triangular guard plate 94 extends from the frame downardly in front of hydraulic cylinder 68 to protect it from damage during use.

In use, the operator selects a tree to be sheared and maneuvers the vehicle and boom until the shearing device 10 is in the position shown in FIG. 1 with the base of the trunk of the tree received through the front opening 38 between the spaced arms 34, 36 of the frame 22. Cylinders 28, 30 are then activated to close grapple arms 24, 26 to grasp the tree to retain it in an upright position when it is sheared. The operator then activates hydraulic cylinder 68 to rotate the blade members 44, 46 from the open position shown in FIG. 2 to the closed position shown in FIG. 3 to shear the tree. As may be seen in FIG. 4, the cutting edge 90, 92 of each blade 86, 87 cuts through the tree trunk in an inward downward arc. This inward downward motion has the effect of reducing cracking or splintering of the butt end of the tree above the cut. Therefore, it is necessary to cut only several inches off of the butt end to square it off during milling rather than the whole cracked and splintered end, thereby minimizing wastage. This downward motion of the blade members 44, 46 also provides the advantage that it shatters the stump below the cut which exposes more of it to more rapid breakdown by the elements following cutting.

Figure 4:
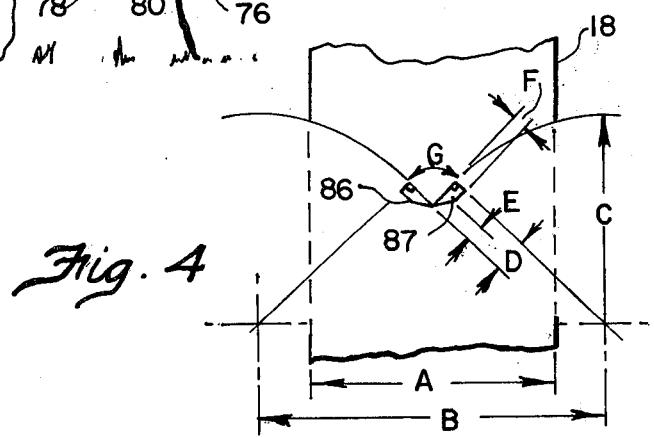
FIG. 4 is a schematic view showing the geometric relationship of the blade members of the device shown in FIG. 1.

Referring to FIG. 4, the applicant has found the geometric relationship of the structure of this embodiment and upper and lower values within which it functions satisfactorily to be given by the following table wherein A is the maximum diameter tree which may be received through the front opening 38 between the spaced parallel arms 34, 36 and B is the distance between the parallel axes of rotation of the blade members 44, 46. Reference is made to FIG. 5 which shows that the line from which dimension D is measured is the radius of the point at which each blade 86, 87 is tangential to the respective arc of rotation.

|   | Preferred Embodiment | Upper | Lower |
|---|---|---|---|
| B | 1.429 A | 1.650 A | 1.250 A |
| C | 0.833 A | 0.950 A | 0.750 A |
| D | 0.143 A | 0.183 A | 0.103 A |
| E | 0.137 A | 0.177 A | 0.097 A |
| F | 0.048 A | 0.063 A | 0.033 A |
| G | 97 ½° | 110° | 80° |

Figure 7:
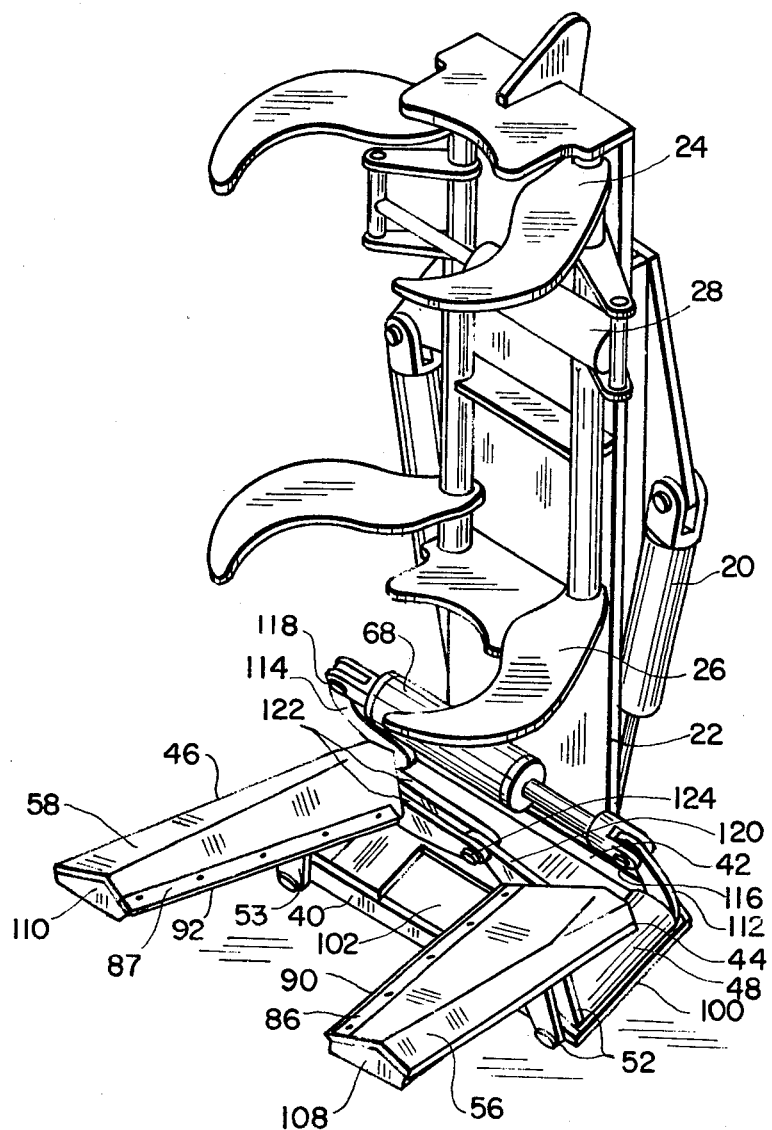
FIG. 7 is a perspective view similar to FIG. 2 showing a tree shearing device according to a second embodiment of the invention.

FIGS. 7 to 9 show a second embodiment of the tree shearing device according to the invention, and as many of the features of the second embodiment are identical to those of the first embodiment, features common to both embodiments are described and illustrated using the same reference numerals. In this second embodiment, while the boom 14 and the grapple arms 24, 26 and hydraulic cylinders 28, 30 remain the same as in the first embodiment, the frame 22 is different in that the lower portion 100 is substantially rectangular shaped and slopes downward from the horizontal towards the front at an angle "H" (shown in FIG. 8). The lower portion 100 of the frame 22 has a rectangular aperture 102 therethrough to prevent the build-up of small branches or pieces of bark which might interfere with the operation of the mechanism. The pair of blade members 44, 46 again each have a lower tube portion 48, 50, an upward extending blade arm 52, 53 and a blade back-up plate 56, 58. However, the relationship of these elements is substantially different from that of the first embodiment in that the pair of lower tube portions 48, 50 are pivotally mounted between front bracket 40 and rear bracket 42 with their axes of rotation parallel to each other but in a plane parallel to the plane of lower portion 100 of frame 22, and the blade back-up plates 56, 58 extend forwardly and upwardly from the respective lower tube portions 48, 50. The rear end of each blade back-up plate 56, 58 is welded to the respective tube portion 48, 50 and double blade arm 52, 53 is welded and bolted to the lower front end of each lower tube portion 48, 50 and to the respective one of the blade back-up plates 56, 58 to form the pair of blade members 44, 46 which pivot on the lower portion 100 of the frame 22. As may clearly be seen in FIG. 7, each back-up plate 86, 87 has different wedge or triangle shaped portions which are angled to provide the necessary configuration. Each of the pair of blade members 44, 46 has a vertical support member 104, 106 extending between the blade arm 52, 53 and the blade back-up plates 56, 58 and a front flange 108, 110 to provide additional strength. Stepped bolting plate 82, 84 is welded to the respective back-up plate 56, 58 and front flange 108, 110, and blades 86, 87 are then bolted to the stepped bolting plates 82, 84 in a manner similar to that of the first embodiment. In this embodiment, a pair of upwardly extending cylinder arms are attached respectively to the lower tube portions 48, 50 of the blade members 44, 46 and opposite ends of hydraulic cylinder 68 are pivotally connected by pins 116, 118 to the upper ends of the clyinder arms, while separate inwardly and upwardly extending pin and slot arms 120, 122 are rigidly attached to respective lower tube portions 48, 50 and interconnected at their inner ends by pin and slot arrangement 124 to insure that the blade members 44, 46 move concurrently.

In use, a tree shearing device according to this embodiment is maneuvered by the operator to a position similar to that shown in FIG. 1 for the first embodiment in which the tree is between the open blades 86, 87 and abutting or nearly abutting on front bracket 40 of the lower portion 100 of frame 22. Hydraulic cylinder 68 is then activated and the blade members 44, 46 pivoted to the closed position shown in FIG. 9 to shear the tree. While the cutting edges 90, 92 still move through an inward downward cutting arc, due to the angle between the cutting edges 90, 92 and the axis of rotation of tube portions 48, 50 this arc is not constant throughout the length of the cutting edges 90, 92. In the closed position, the abutting cutting edges 90, 92 extend horizontably at the angle H to the axis of rotation of the lower tube portions 48, 50. In this embodiment, angle H is 37½° and the tree shearing device according to the invention is satisfactorily operable if this angle is varied plus or minus 20°. In this embodiment, the geometry of the cutting arc at a point midway along the length of the cutting edges 90, 92 is the same as that shown and described for the first embodiment in FIG. 4. This embodiment has the advantage over the first embodiment that when the operator lowers the shearing device to a position adjacent the ground, the tree is sheared several inches lower thus shortening the stump and reducing wastage.

Although the disclosure describes and illustrates two preferred embodiments of the tree shearing device according to the invention, it is to be understood that the invention is not restricted to these particular embodiments and for a definition of the invention reference is made to the appended claims.

What I claim is:

1. A tree shearing device comprising:
   a. a frame adapted to be mounted on a selected woodland vehicle;
   b. a pair of blade means pivotally mounted on said frame for pivotal reciprocal motion around a pair of substantially parallel axes extending on opposite sides of the tree between an open and a closed position, each of the blade means having an elongated blade edge which abuts the other blade edge in the closed position at a point spaced above said pivot axes;
   c. power means operatively connected to the blade means to move the blade means in opposite directions between the open and closed positions, and
   d. means interconnecting the blade means to ensure the blade means move concurrently; whereby the blade edges are moved from open positions on opposte sides of a tree trunk inwardly downwardly through arcs to the closed position to shear the tree trunk and then returned to the open position to receive the next tree trunk therebetween, the arcs formed by movement of the blade edges extending in opposed relationship with their greatest inclination to horizontal where the arcs join, being the point where the blade edges abut.

2. A tree shearing device as claimed in claim 1 wherein the power means comprises a single hydraulic cylinder pivotally connected at opposite ends thereof to the respective blade means.

3. A tree shearing device as claimed in claim 1, wherein the pair of axis the blade means pivot about are substantially horizontal and the blade edges are substantially horizontal and maintain a parallel relationship therebetween throughout their travel.

4. A tree shearing device as claimed in claim 2 wherein the frame has a U-shaped lower horizontal portion with spaced apart parallel arms which define a front opening to receive the tree trunk therethrough, each of the blade means being pivotally mounted on one of the arms of the U-shaped portion of the frame.

5. A tree shearing device as claimed in claim 4 wherein each blade means includes a cylindrical tube portion rotatably mounted horizontally on one of the arms of the U-shaped portion of the frame, the two tube portions thereby being mounted in a parallel relationship on opposite sides of the tree trunk receiving opening, the hydraulic cylinder being connected to the tube portions towards their rear ends to pivotally drive the blade means.

6. A tree shearing device as claimed in claim 5 wherein each blade means includes front and rear upwardly extending blade arms rigidly connected to the cylindrical tube portion and a blade extending across between the ends of the blade arms.

7. A tree shearing device as claimed in claim 2 wherein the frame has a protective member extending in front of the cylinder to protect it against damage by the tree.

8. A tree shearing device as claimed in claim 1, wherein the pair of axis the blade means pivot about are inclined forwardly downwardly, the blade edges extend at an angle of from $17\frac{1}{2}°$ to $57\frac{1}{2}°$ to their respective axis, and the blade edges are substantially horizontal in the closed position.

9. A tree shearing device comprising:
   a. a frame adapted to be mounted on a selected woodland vehicle;
   b. a pair of blade means pivotally mounted on said frame for pivotal reciprocal motion around a pair of substantially parallel axes between an open and a closed position, each of the blade means having an elongated blade edge which abuts the other blade edge in the closed position;
   c. power means operatively connected to the blade means to move the blade means in opposite directions between the open and closed positions, and
   d. means interconnecting the blade means to ensure the blade means move concurrently; the interconnecting means comprising a pair of arms each rigidly attached at one end to one of the blade means, the other ends of the arms being interconnected by a pin and slot connection, whereby the blade edges are moved from the open position on opposite sides of a tree trunk inwardly downwardly through an arc to the closed position to shear the tree trunk and then returned to the open position to receive the next tree trunk therebetween.

10. A tree shearing device as claimed in claim 9 wherein the frame has a lower portion inlcined forwardly downward and the blade means each include a cylindrical tube portion, the cylindrical tube portions being pivotally mounted in a spaced parallel relationship on the lower portion of the frame, the blade edges projecting forwardly of the lower portion of the frame to receive a tree therebetween and sloping forwardly upward and an angle of from $17\frac{1}{2}°$ to $57\frac{1}{2}°$ to the rotary axis of the respective tube portions of the blade means.

11. A tree shearing device as claimed in claim 10 wherein the hydraulic cylinder is connected to the tubes adjacent their rear ends to pivotally drive the blade means between the open and closed positions.

12. A tree shearing device as claimed in claim 10 wherein each blade means includes a front upwardly extending blade arm rigidly connected to the cylindrical tube portion, and a blade rigidly connected at its rear end to the tube portion and to the upward extending end of the blade arm.

* * * * *